United States Patent
Du

(10) Patent No.: US 8,423,552 B2
(45) Date of Patent: Apr. 16, 2013

(54) METHOD OF CALCULATING CONNECTIVITY OF N-DIMENSIONAL SPACE

(75) Inventor: Yao-Hong Du, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/224,342

(22) Filed: Sep. 2, 2011

(65) Prior Publication Data
US 2012/0303620 A1  Nov. 29, 2012

(30) Foreign Application Priority Data
May 25, 2011 (CN) .......................... 2011 1 0137691

(51) Int. Cl.
G06F 7/00 (2006.01)
G06F 17/30 (2006.01)

(52) U.S. Cl.
USPC ............ 707/737; 382/164; 382/173; 382/225

(58) Field of Classification Search .................. 707/737; 382/164, 173, 225
See application file for complete search history.

(56) References Cited

U.S. PATENT DOCUMENTS

| | | | | |
|---|---|---|---|---|
| 7,298,899 B2* | 11/2007 | Koide et al. | ................... | 382/173 |
| 2002/0031268 A1* | 3/2002 | Prabhakar et al. | ............ | 382/224 |
| 2003/0044061 A1* | 3/2003 | Prempraneerach et al. | .. | 382/164 |
| 2003/0128396 A1* | 7/2003 | Fan | .............................. | 358/3.27 |
| 2003/0128874 A1* | 7/2003 | Fan | .............................. | 382/170 |
| 2005/0232494 A1* | 10/2005 | Fan | .............................. | 382/224 |
| 2008/0139966 A1* | 6/2008 | Zhang et al. | .................. | 600/590 |
| 2009/0281728 A1* | 11/2009 | Mishra et al. | ................. | 701/210 |
| 2010/0033633 A1* | 2/2010 | Dane et al. | ..................... | 348/625 |
| 2010/0272357 A1* | 10/2010 | Maxwell et al. | ............. | 382/173 |
| 2010/0332475 A1* | 12/2010 | Birdwell et al. | ............. | 707/737 |
| 2012/0134576 A1* | 5/2012 | Sharma et al. | ................ | 382/155 |

\* cited by examiner

*Primary Examiner* — Robert Beausoliel, Jr.
*Assistant Examiner* — Nicholas Allen
(74) *Attorney, Agent, or Firm* — Altis Law Group, Inc.

(57) ABSTRACT

A method for calculating connectivity of a space having a number of objects using a computer system includes establishing a character matrix having a number of elements in accordance with the objects. A label matrix is established, and the character matrix is divided into blocks. Connectivity of the elements of each of the blocks is calculated, and then the elements are grouped into regions based on the values of the elements. Each of the regions is labeled and enhanced. Connectivity of the regions is calculated, and the regions are grouped into larger regions based on the values of the elements.

13 Claims, 2 Drawing Sheets

METHOD OF CALCULATING CONNECTIVITY OF N-DIMENSIONAL SPACE

BACKGROUND

1. Technical Field

The present disclosure relates to a method of calculating, and particularly, to a method of calculating connectivity of an N-dimensional space.

2. Description of Related Art

Elements in a space can be connected to form regions based on their relative values, and the calculation of connectivity is widely used for image segmentation, network communication, data compression etc. Some approaches like neighbor searching can be used to calculate connectivity in a space; however, the neighbor searching method consumes too many resources in a single computer.

Therefore, what is needed is a method of calculating connectivity of an N-dimensional space that overcomes the above-mentioned problem.

BRIEF DESCRIPTION OF THE DRAWINGS

The components in the drawings are not necessarily drawn to scale, the emphasis instead being placed upon clearly illustrating the principles of a method of calculating connectivity of an N-dimensional space. Moreover, in the drawings, like reference numerals designate corresponding parts throughout the several views.

DETAILED DESCRIPTION

Figure 1:
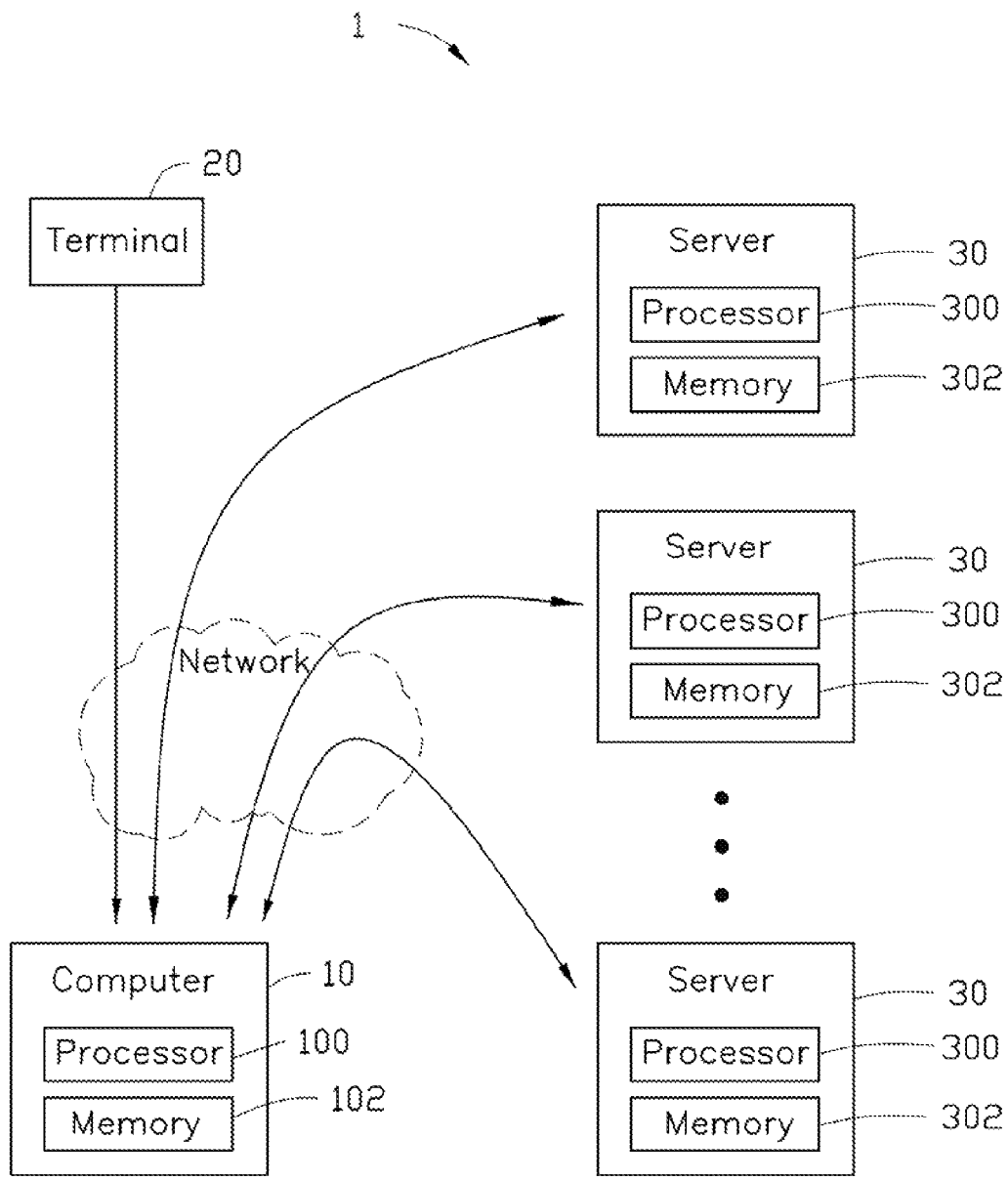
FIG. 1 is a block diagram of an exemplary computer system for calculating connectivity of an N-dimensional space.

Referring to FIG. 1, a computer system 1 of the present embodiment includes a computer 10, a terminal 20, and a number of servers 30. The computer 10 is connected with the terminal 20 and the servers 30 through network connection. The computer 10 includes a processor 100 and a memory 102, and each of the servers 30 includes a processor 300 and a memory 302.

Figure 2:
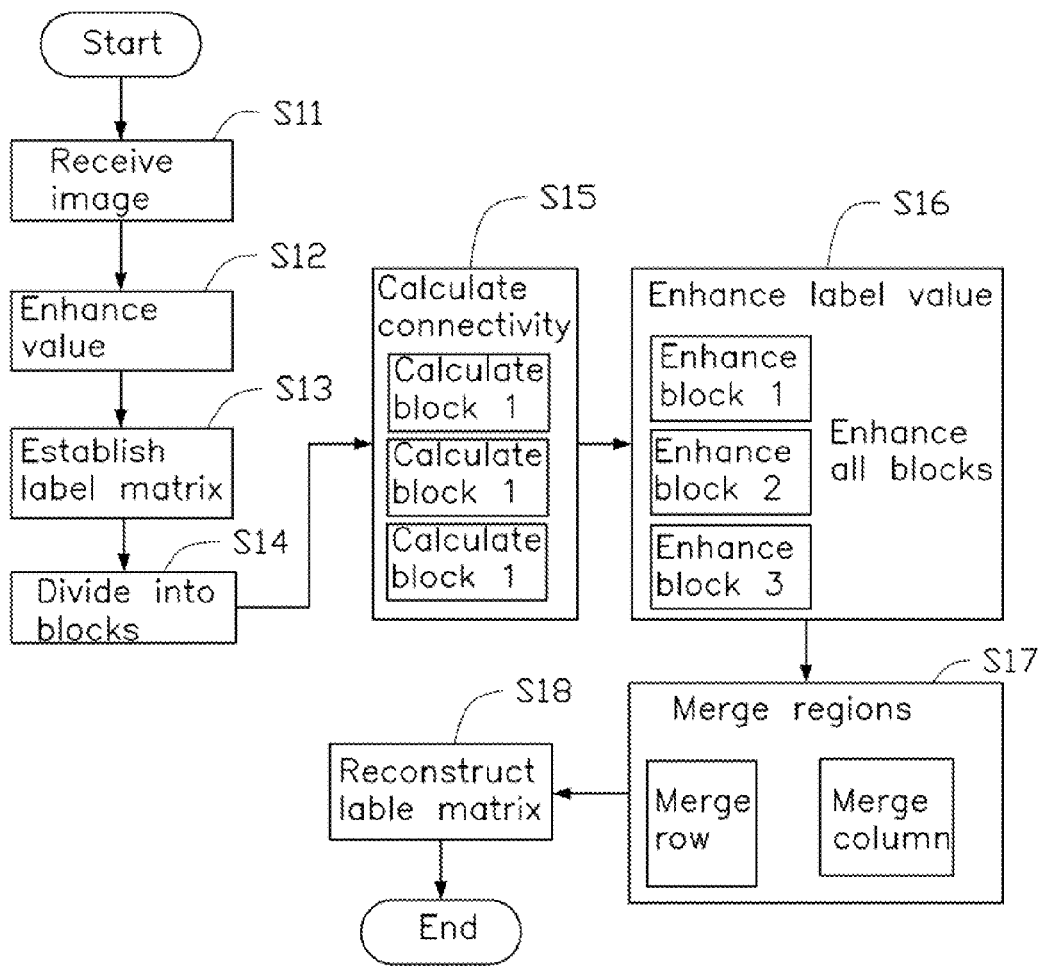
FIG. 2 is a flowchart of a method of calculating connectivity of an N-dimensional space in accordance with an exemplary embodiment.

Referring to FIG. 2, one example of a method of calculating connectivity of an N-dimensional space is exemplified by an image segmentation method. It should be understood that additional steps may be added, others deleted, and the ordering of the steps may be changed depending on the embodiment.

In step S11, an image received from the terminal 20 is stored in the memory 102 of the computer 10, and is processed by the processor 100 of the computer 10. The image is converted from RGB into CIE-Luv color space. The CIE-Luv color space is quantized to form a character matrix, and each element of the character matrix represents a pixel of the image and has a value of sqrt $(L^2+u^2+v^2)$. Coordinates of each element in the character matrix represents position of the corresponding pixel in the image.

In step S12, the elements of the character matrix are enhanced for further processing. The character matrix is scanned for maximum (MAX) and minimum (MIN); if MAX=MIN, all the elements of the character matrix are determined to be connected and no further calculation is needed; if MAX≠MIN, (MIN−1) is subtracted from each of the element, and all of the elements of the character matrix are greater than zero.

In step S13, a label matrix is established, and the dimension of the label matrix is equal to the dimension of the character matrix.

In step S14, the character matrix is divided into a number of smaller blocks with equal dimensions. In the present embodiment, 128×128, 256×256, and 512×512 is recommended for each of the blocks.

In step S15, each of the blocks is independently transferred to servers 30 for calculating connectivity of the elements of the blocks. The blocks are stored in the memory 302 of the server 30 and processed by the processor 302. The elements of each of the blocks are grouped into regions based on a pre-determined search method. Different regions in each of the blocks are labeled differently. The blocks having the labels are transferred to computer 10 and inputted at corresponding coordinates of the label matrix. In the present embodiment, the servers 30 are cloud servers, and the search method is an eight-neighbors search method.

As each of the blocks is processed independently in different servers 30, the labels may be duplicated in different blocks. In step S16, the labels are enhanced to differentiate matching labels between different blocks. Each of the blocks is scanned for maximum (max) and minimum (min), and (min−1) is subtracted from each of the labels, and each of the labels is added with the maximum of the previous block to ensure each of the labels is different from others.

The regions in different blocks need to be merged if the regions have connectivity with adjacent regions. In step S17, when merging the adjacent regions in columns, the computer calculates connectivity of an element of a block and a right adjacent element of a right adjacent block, and if the value of the two elements are equal according to the character matrix, the label of the region having the element is replaced with the label of the region having the right adjacent element, and thus the two regions in adjacent blocks are merged into a larger region. When merging the adjacent regions in rows, different regions in two top/bottom adjacent blocks can be merged in the same way. The regions in the label matrix can be merged iteratively until the adjacent regions with connectivity are all merged in the label matrix.

In step S18, the label matrix is reconstructed as (i, j, v), which respectively represent row, column, and the label, and the label is reordered sequentially. Therefore, the numbers of the regions can be determined according to (v), and coordinates of the elements in the regions can be indicated by (i, j). The number of segments of the image and the pixels of each of the segments can be respectively determined according to the label matrix. The calculating method in the present embodiment can allow data to be independently and simultaneously processed, and thus saves the time for calculating connectivity of N-dimensional space.

In another embodiment, the image can be received from a storage device of the computer 10 rather than form the terminal 20, and different blocks can be processed in the computer 10 without using servers 30.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A computer-implemented method of a computer system comprising a processor, wherein the space comprises a plurality of objects and the processor executes steps for calculating connectivity of a space using, the steps comprising:

establishing a character matrix comprising a plurality of elements, wherein coordinates of the plurality of elements in the matrix respectively refer to the positions of the plurality of objects of the space, and values of the plurality of elements respectively refer to characters of the plurality of objects;

establishing a label matrix, wherein dimension of the label matrix is equal to dimension of the character matrix;

dividing the character matrix into a plurality of blocks having corresponding elements therein;

calculating connectivity of the corresponding elements of the plurality of blocks using the processor, based on the values of the plurality of elements, and the corresponding elements are grouped into at least one region in accordance with the connectivity of the corresponding elements;

labeling each of the at least one region with a label, wherein the plurality of blocks having the at least one region are inputted to corresponding coordinates of the label matrix;

enhancing the labels of the plurality of blocks of the label matrix to differentiate the labels between the plurality of blocks; and calculating connectivity of the at least one region of an adjacent plurality of blocks, using the processor, based on the values of the plurality of elements of the adjacent plurality of blocks, and the at least one region of the adjacent plurality of blocks are grouped into at least one larger region in accordance with the connectivity of the at least one region of the adjacent plurality of blocks.

2. The method claimed in claim 1, wherein the computer system comprises at least one server connected with the computer through a network; the server comprises a second processor to calculate the connectivity of the plurality of blocks and label each of the at least one region.

3. The method claimed in claim 1, wherein the computer system comprises a terminal connected with the computer through a network; the space is received from the terminal and stored in a memory of the computer.

4. The method claimed in claim 1, wherein each of the plurality of blocks is calculated independently.

5. The method claimed in claim 1, wherein adjacent regions in left/right adjacent blocks are detected in the label matrix, and the adjacent regions are calculated, using the processor, for connectivity based on the value of the adjacent elements of the adjacent regions of different blocks; the label of the adjacent region having the adjacent element of the left adjacent block is replaced with the label of the adjacent region having the adjacent element of the right adjacent block.

6. The method claimed in claim 1, wherein a neighbor searching method is used to calculate connectivity.

7. The method claimed in claim 1, wherein each of the labels is added with the maximum value of the previous block.

8. The method claimed in claim 1, wherein the plurality of elements are scanned for maximum (MAX) and minimum (MIN), and (MIN−1) is subtracted from each of the plurality of elements if MAX≠MIN.

9. A non-transitory computer readable medium encoded with a computer program, the program comprising instructions that when executed by a processor of a data processing apparatus causes the data processing apparatus to perform operations comprising:

establishing a character matrix comprising a plurality of elements, wherein coordinates of the plurality of elements in the matrix respectively refer to the positions of the plurality of objects of a the space, and values of the plurality of elements respectively refer to characters of the plurality of objects;

establishing a label matrix, wherein dimension of the label matrix is equal to dimension of the character matrix;

dividing the character matrix into a plurality of blocks having corresponding elements therein;

calculating connectivity of the corresponding elements of the plurality of blocks, using the processor, based on the values of the plurality of elements, and the corresponding elements are grouped into at least one region in accordance with the connectivity of the corresponding elements;

labeling each of the at least one region with a label, wherein the plurality of blocks having the at least one region are inputted to corresponding coordinates of the label matrix;

enhancing the labels of the plurality of blocks of the label matrix to differentiate the labels between the plurality of blocks; and calculating connectivity of the at least one region of an adjacent plurality of blocks, using the processor, based on the values of the plurality of elements of the adjacent plurality of blocks, and the at least one region of the adjacent plurality of blocks are grouped into at least one larger region in accordance with the connectivity of the at least one region of the adjacent plurality of blocks.

10. The non-transitory computer readable medium as claimed in claim 9, wherein each of the plurality of blocks is calculated independently.

11. The non-transitory computer readable medium as claimed in claim 9, wherein adjacent regions in left/right adjacent blocks are detected in the label matrix, and the adjacent regions are calculated, using the processor, for connectivity based on the value of the adjacent elements of the adjacent regions of different blocks; the label of the adjacent region having the adjacent element of the left adjacent block is replaced with the label of the adjacent region having the adjacent element of the right adjacent block.

12. The non-transitory computer readable medium as claimed in claim 9, wherein a neighbor searching method is used to calculate connectivity.

13. The non-transitory computer readable medium as claimed in claim 9, wherein each of the labels is added with the maximum value of the previous block.

* * * * *